United States Patent [19]
Stepek et al.

[11] 3,910,949
[45] Oct. 7, 1975

[54] MANUFACTURE OF 1,2-DIMETHYL-3,5-DIPHENYLPYRAZOLIUM METHYLSULFATE IN A SINGLE REACTION ZONE

[75] Inventors: Walter Joseph Stepek; Murray Garber; Don Wesley Long, all of Trenton, N.J.

[73] Assignee: American Cyanamid Company, Stamford, Conn.

[22] Filed: Dec. 9, 1974

[21] Appl. No.: 530,789

[52] U.S. Cl. .............................. 260/311; 260/310 R
[51] Int. Cl.² ........................................ C07D 231/12
[58] Field of Search ...................... 260/311, 310 R

[56] References Cited
FOREIGN PATENTS OR APPLICATIONS
2,260,485   6/1973   Germany
1,315,825   5/1973   United Kingdom

*Primary Examiner*—Donald B. Moyer
*Attorney, Agent, or Firm*—Harry H. Kline

[57] ABSTRACT

There is provided a process for the manufacture of the compound: 1,2-dimethyl-3,5-diphenylpyrazolium methylsulfate in a single reaction zone. Said compound finds utility as a herbicide in the selective control of wild oats in wheat, barley and other agricultural crops.

2 Claims, No Drawings

MANUFACTURE OF 1,2-DIMETHYL-3,5-DIPHENYLPYRAZOLIUM METHYLSULFATE IN A SINGLE REACTION ZONE

The present invention relates to a method for preparing 1,2-dimethyl-3,5-diphenylpyrazolium methylsulfate, useful as a herbicide for the selective control of wild oats. More particularly, the present invention relates to a process wherein the overall reactions resulting in the preparation of 1,2-dimethyl-3,5-diphenylpyrazolium methylsulfate are carried out in a single zone in which none of the formed intermediates are isolated or purified prior to further reaction. Still more particularly, the overall process is concerned with the reactions involving equimolar amounts of benzaldehyde and acetophenone to obtain benzalacetophenone which is then reacted with hydrazine to form 3,5-diphenylpyrazoline, followed by dehydrogenation, alkylation, and quaternization to attain the desired 1,2-dimethyl-3,5-diphenylpyrazolium methylsulfate salt in a single zone and in good yield and purity.

As is known, 1,2-dimethyl-3,5-diphenylpyrazolium salts exhibit herbicidal properties being especially useful for the selective control of wild oats in wheat, barley and other agricultural crops. Several methods for the preparation of these salts are known. One such process involves the reaction of an unsubstituted or substituted dibenzoylmethane with an alkylhydrazine as, for instance, the reaction of dibenzoylmethane with methylhydrazine in pyridine solvent at an elevated temperature. There is then obtained an intermediate, 1-methyl-3,5-diphenylpyrazole, which is isolated, dried, redissolved in xylene and, finally, quaternized with methyl-p-toluenesulfonate to give the desired 1,2-dimethyl-3,5-diphenylpyrazolium-p-toluenesulfonate. Unfortunately, this method, as well as others, require the separation of at least one intermediate, thereby causing loss of overall yields and attendant increases in labor charges. If a salt of the above-defined class of compounds could be prepared absent any separation of an intermediate product, such a process would fulfill a long felt need in the art.

In general, the overall reactions of the present invention involve the following sequence of steps:

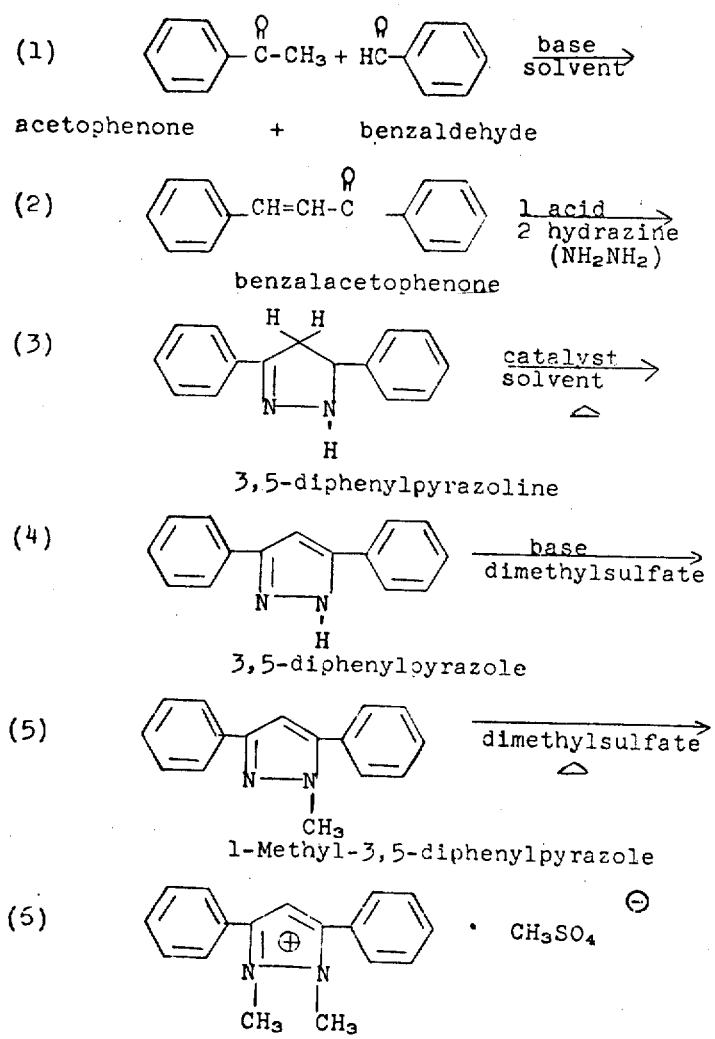

In the aforementioned overall process, none of the reactants nor formed intermediates need be removed. Thus, commencing with the condensation of acetophenone with benzaldehyde and concluding with the catalytic reduction of 3,5-diphenylpyrazoline to the corresponding pyrazole, all the intermediates are permitted to remain in the zone of reaction. Thus, the requirement for high temperature filtration of the catalyst, for instance, is eliminated and the intermediate, 3,5-diphenylpyrazole, similarly is not isolated and purified. Rather, the in situ solution comprising the resulting mixture is employed as such. Filtration and washing of the intermediate is eliminated, resulting in marked savings on materials and labor, on increased yields, and in purity of desired product.

As a preferred embodiment of the invention there is reacted approximately an equimolar amount of acetophenone and benzaldehyde in the presence of aqueous methanol and small amounts of a base, such as sodium hydroxide, potassium hydroxide, or lithium hydroxide, usually between 0.1 mole to 0.5 mole, based on one mole of said ketone. The reaction mixture is maintained over a wide range of temperatures, namely, from 10°C. to 70°C. and, preferably, between 20°C. and 40°C. for a period of time ranging from about 1 to 6 hours. The pH of the resultant reaction mixture is next adjusted to 7, or below, preferably to between pH 5 and pH 7. This is accomplished by adding a suitable mineral acid, such as hydrochloric or sulfuric acid. The amount of acid required for pH adjustment will usually approximate an equivalent of base employed in the reaction.

It is a good practice to subsequently add an aqueous solution of at least an equimolar amount of hydrazine and, preferably, from about 1.1 to about 2.0 mole equivalents at a temperature below 70°C., usually between 20°C. and 30°C. to the above reaction mixture. Since the reaction is exothermic, cooling is generally required, although it is preferred to maintain the temperature of the reaction in the range of from 40°C. to 50°C. It is also preferred to displace any air over the reaction mixture with an inert gas, such as nitrogen or carbon dioxide, to prevent air oxidation of the formed 3,5-diphenylpyrazoline. Other inert gases, such as argon or helium can also be used, if desired.

The aforementioned reaction is quite rapid and is usually completed in about 1 to 3 hours. Methanol is next removed by distillation under nitrogen and replaced with xylene. The xylene solution is then washed with water. Next, a dehydrogenation catalyst, palladium on carbon, is added and the solution is then heated at reflux. Any water present is removed by azeotropic distillation while maintaining an inert nitrogen or carbon dioxide atmosphere above the reaction mixture. The reaction involving dehydrogenation is usually completed in about 3 hours. The latter reaction mixture which contains the dehydrogenation catalyst is cooled to about 50°C. An excess of anhydrous sodium hydroxide or other base (i.e., 1.0 to 2.0 moles based on acetophenone) is added and the mixture is maintained for about one-half hour at from 40°C. to 100°C., usually from 50°C. to 60°C., to form the sodium salt of said pyrazole. Dimethylsulfate is next added in equimolar, but preferably in excess amounts (i.e., from about 1.0 to 1.5 mole equivalent, based on acetophenone) over a period of about 1 hour. The reaction mixture is maintained for about 1 additional hour at a temperature range of between 50°C., to 150°C., preferably between 80°C. to 90°C. and the resulting solution of 1-methyl-3,5-diphenylpyrazole is filtered off at about 50°C. to remove the dehydrogenation catalyst therefrom and to obtain in said reaction zone 1-methyl-3,5-diphenylpyrazole. Ethylene dichloride is added thereto in an amount sufficient to obtain an approximately 50% wt./vol. solution of the said pyrazole in an approximately 50:50 mix (by volume) of xylene-ethylene dichloride. The pyrazole content of the above solution is determined and an equimolar amount of dimethylsulfate is added. The reaction mixture is then held at from 60°C. to 120°C. for a period of between 1 and 6 hours to complete the reaction. The reaction mixture is next cooled to from about 0°C. to 20°C., preferably 15°C. and an aliphatic amine, preferably, diethylamine or triethylamine added to react with any unreacted dimethylsulfate. Resultant solution is further cooled to 10°C. and then filtered to obtain 1,2-dimethyl-3,5-diphenylpyrazolium methylsulfate which is finally washed with xylene and acetone and dried.

The following examples further illustrate the invention, but are not to be deemed limitative thereof. All parts and percentages are by weight, unless otherwise specified.

EXAMPLE 1

Preparation of 1,2-Dimethyl-3,5-diphenylpyrazolium Methylsulfate

Acetophenone (480 g, 4.0 mole) and benzaldehyde (424.8 g, 4.0 mole) are dissolved in methanol (2,600 ml) in a suitable reaction vessel. Water (400 ml) and a 50% aqueous sodium hydroxide (160.0 g, 2.0 mole) are added and the mixture stirred 4 hours at room temperature till the condensation to benzalacetophenone is complete.

Resultant mixture is next adjusted to pH 5 utilizing 37% aqueous hydrochloric acid (193.6 g, 2.0 mole). A 75% aqueous solution of hydrazine hydrate (294.4 g, 4.4 mole) is added at 25°C. under a nitrogen atmosphere, allowing the temperature of the reaction mixture to increase to 40°C. to 50°C. Ring closure occurs whereby 3,5-diphenylpyrazoline is then obtained.

Methanol is then removed by distillation under a nitrogen atmosphere xylene (1,960 ml) is next added and the xylene solution is washed with water. An aqueous layer is removed from the organic layer. A catalyst, 5% palladium on carbon (6.64 g) moistened with 50%, by weight, of water, is then added. The mixture is stirred and heated at reflux temperatures under a nitrogen atmosphere to dehydrogenate the 3,5-diphenylpyrazoline to obtain 3,5-diphenylpyrazole. Dehydrogenation is complete in about 3 hours. The latter reaction mixture is cooled to 50°C., anhydrous sodium hydroxide (213.6 g, 5.336 mole) being added, and held at 50°C. to 60°C. for one half hour. Dimethylsulfate (536.8 g, 4.256 mole) is added over a 1 hour period so as to effect the alkylation of 3,5-diphenylpyrazole to 1-methyl-3,5-phenylpyrazole. The reaction mixture is so maintained for 1 additional hour at 80°C. to 90°C. and the xylene layer is washed with dilute sodium hydroxide solution at pH 11. The palladium catalyst is filtered off, washed with xylene, and the xylene solution is separated from the aqueous phase.

Resultant xylene solution is concentrated by distilling off part of the xylene and dried so as to remove trace amounts of water present. There is next added dry ethylene dichloride to obtain an approximately 50% wt./vol. solution of crude 1-methyl-3,5-diphenylpyrazole in a solvent system consisting of an approximately 50:50 mixture by volume of ethylene dichloride and xylene. An equimolar amount of dimethylsulfate is added to this solution containing 1-methyl-3,5-diphenylpyrazole and heated to temperatures ranging from 95°C. to 100°C. for 4 hours so as to complete the quaternization of 1-methyl-3,5-diphenylpyrazole. There is then obtained 1,2-dimethyl-3,5-diphenylpyrazolium methylsulfate. The latter is cooled to 50°C. and there is next added triethylamine to react with any residual dimethylsulfate. The resulting product is further cooled to 15°C. and filtered. It is washed with xylene, followed by an acetone washing, and dried to constant weight. The product yield calculated, based on the weight of acetophenone, is 78.5%.

EXAMPLE 2

The procedure of Example 1 is used except that methanol recycled from Example 1 is used in the overall procedure. The product yield calculated based on the weight of acetophenone is 72.9%.

We claim:

1. A process for the preparation of 1,2-dimethyl-3,5-diphenylpyrazolium methylsulfate having the formula:

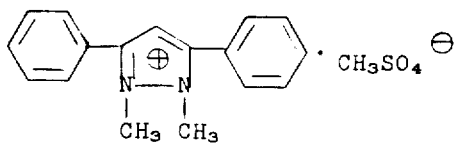

comprising the steps of adding in a single reaction zone anhydrous alkali metal hydroxide to an anhydrous solution of 3,5-diphenylpyrazole containing a residual dehydrogenation catalyst, heating said solution in the range of about between 40°C. to 100°C. for a period of about one-half hour to form the alkali metal salt of said pyrazole; reacting said salt of said pyrazole with from about 1 to about 2 mole equivalents of dimethylsulfate for from 1 to 2 hours in the temperature range between 50°C. and 150°C.; filtering off the catalyst; separating the aqueous phase from organic phase; concentrating the said organic phase and rendering the latter phase anhydrous by distilling off part of the solvent and azeotropically removing any water present; adding to the anhydrous organic phase a chlorinated hydrocarbon solvent selected from the group consisting of chloroform and ethylene dichloride; adding at least an equimolar amount of dimethylsulfate; heating the latter reaction mixture at a temperature ranging from about 60°C. to 120°C.; cooling the solution to about 0°C. to 20°C. and recovering 1,2-dimethyl-3,5-diphenylpyrazolium methylsulfate in good yield and purity.

2. The method of claim 1 wherein the alkali metal hydroxide is sodium hydroxide and the chlorinated hydrocarbon solvent is ethylene dichloride.

* * * * *